United States Patent [19]

Houck

[11] Patent Number: 4,900,065

[45] Date of Patent: Feb. 13, 1990

[54] QUICK-CONNECT FLUID COUPLING

[75] Inventor: Douglas L. Houck, Canton, Ohio

[73] Assignee: DLH Industries, Inc., Canton, Ohio

[21] Appl. No.: 264,347

[22] Filed: Oct. 31, 1988

[51] Int. Cl.⁴ .......................................... F16L 39/00
[52] U.S. Cl. .................................. 285/73; 285/137.1; 285/319
[58] Field of Search ................ 285/137.1, 73, 71, 65, 285/319

[56] References Cited

U.S. PATENT DOCUMENTS

| | | | |
|---|---|---|---|
| 1,150,717 | 8/1915 | Sweet | 285/65 |
| 3,453,005 | 7/1969 | Foults | 285/82 |
| 3,469,863 | 9/1969 | Riester et al. | 285/137.1 |
| 3,523,700 | 8/1970 | Palmer | 285/137.1 |
| 3,640,552 | 2/1972 | Demler, Sr. et al. | 285/137.1 X |
| 3,929,357 | 12/1975 | DeVincent et al. | 285/319 |
| 4,009,896 | 3/1977 | Brewer | 285/305 |
| 4,076,279 | 2/1978 | Klotz | 285/137.1 X |
| 4,247,133 | 1/1981 | Moller | 285/73 X |
| 4,754,993 | 7/1988 | Kraynick | 285/137.1 |
| 4,804,208 | 2/1989 | Dye | 285/137.1 X |

FOREIGN PATENT DOCUMENTS

| | | | |
|---|---|---|---|
| 2276768 | 1/1976 | France | 285/137.1 |
| 1156031 | 6/1969 | United Kingdom | 285/137.1 |
| 1443399 | 7/1976 | United Kingdom | 285/137.1 |

Primary Examiner—Thomas F. Callaghan
Attorney, Agent, or Firm—Michael Sand Co.

[57] ABSTRACT

A quick-connect fluid coupling for fluid conduits includes first and second identical inter-fitting bodies (10, 10'). Each of said bodies includes barrel portions (14) and sleeve portions (16). The sleeve portions include barrel accepting recesses (34). Each body portion also has a forward projection (48) including an angled ramp (50) and a step (52) and an opposed U-shaped latch (54). The body also has tubing accepting bores (26, 42) which accept ends of fluid conduit tubes. First and second fluid passages (30,46) extend through the body to the barrel portion and barrel accepting recess respectively. When the bodies are joined in opposed inter-fitting relations, the barrel portions on the first body are accepted into the barrel accepting recesses on the second body and vice versa. The step on the forward projection on the first body catches in the U-shaped latch on the second body and vice versa to hold the bodies together. The bodies forming the coupling are readily separable by depressing the forward projections and pulling the bodies apart.

11 Claims, 2 Drawing Sheets

QUICK-CONNECT FLUID COUPLING

BACKGROUND OF THE INVENTION

1. Technical Field

This invention relates to quick-connect fluid couplings. Particularly, this invention relates to an hermaphroditic quick-connect fluid couplings for multiple fluid or vacuum lines.

2. Background Information

Many types of fluid couplings are known in the prior art for connecting fluid conduits. Examples are shown in U.S. Pat. Nos. 3,453,005; 3,929,357; and 4,009,896. In general, such prior quick-connect fluid couplings are for connecting only a single fluid line. Thus, in systems where multiple lines are used, a coupling must be provided for each line. This adds to the cost of systems which have many lines.

It is common in motor vehicles to use vacuum actuated controls for the heating, ventilating and air conditioning system referred to in the industry as (HVAC). These systems have a number of small vacuum lines which run from the driver's controls to the various dashpots that actuate components of the system. Running numerous vacuum lines to difficult to reach locations is a labor-intensive job which complicates assembly and adds to the cost of making or repairing the vehicle. This is why multiple-line harnesses currently utilize multi-port connectors to simplify assembly. The current connectors are, in general, very difficult to mate together. A need exists for a low-effort, economical, multi-port device for automotive HVAC applications.

Most fluid couplings use two dissimilar mating pieces to form the coupling generally a male and a female end. Therefore, two different pieces must be manufactured and connected to the ends of the conduit. This further adds to the cost of the coupling.

A further drawback of many prior art couplings is that they require considerable dexterity to couple and uncouple. Additionally, insertion efforts for many prior art couplings is excessively high, especially those coupling that had been designed for multiple lines. Often the coupling has to be visible before it can be easily connected or disconnected. This is particularly a problem when the coupling is located in a place where it is not visible such as under the dashboard of a vehicle.

SUMMARY OF THE INVENTION

It is an object of the present invention to produce an hermaphroditic quick-connect fluid coupling that can be used to connect multiple fluid conduits through a single coupling.

It is a further object of the present invention to provide a quick-connect fluid coupling that is easy to couple and uncouple, even when it is not visible. Additionally, it provides a secure retention of both halves after assembly unless intentionally disconnected.

It is a further object of the present invention to provide a quick-connect fluid coupling that utilizes two identical mating pieces.

It is a further object of the present invention to provide a quick-connect fluid coupling that is inexpensive to produce and use.

It is a further object of the present invention to provide a quick-connect fluid coupling that by varying the materials for the connector body and seals, the assembly can be made impervious to most any desired fluid.

It is a further object of the present invention to provide a quick-connect fluid coupling that may be used to connect multiple vacuum lines in vehicle heating and air conditioning systems, to lower the cost of assembly and repair of such systems.

It is a further object of the present invention to provide a quick-connect fluid coupling that by controlling the width of the retaining clip and U-latch and the positions of the male and female sleeves, the unit can be made impervious to misalignment.

The foregoing objects are accomplished by an hermaphroditic quick-connect fluid coupling which is comprised of identical, inter-fitting bodies. Each body includes a plurality of cylindrical barrel portions extending from the body and the same number of sleeve portions extending from the body. The barrel portions and sleeve portions extend from the body along parallel axis in a first direction. Each sleeve portion includes a barrel accepting recess, sized for accepting a barrel portion. Each barrel accepting recess includes a slot in which an O-ring is positioned.

Each body incorporates a first tube sleeve associated with each barrel portion, and a second tube sleeve associated with each sleeve portion. Each first tube sleeve includes a first tube accepting bore for accepting an end of a first fluid conduit or piece of vacuum tubing. Likewise each second tube sleeve includes a second tube accepting bore for accepting an end of a second fluid conduit or piece of vacuum tubing. The tubing is held in the bores by an adhesive or other holding means.

First fluid passage means extends through the body from each first tube accepting bore to a fluid opening in an outward tip of a barrel portion. Second fluid passage means extends through the body from each second tube accepting bore to an innerface inside a barrel accepting recess.

A forward projection extends from a first side of the body in a first direction. The forward projection terminates in an angled ramp having a step. The forward projection is resilient and capable of slight bending without breakage. A U-shaped latch is positioned on the body opposite the forward projection.

When the hermaphroditic bodies are connected together to form the coupling of the preferred form of the present invention, the barrel portions on the first body are accepted into the recesses on the second body. The barrel portions on the second body are accepted into the barrel accepting recesses on the first body. The O-rings serve to seal the barrels in the recesses. Thus, each first fluid conduit connected to the first body, is placed in fluid connection with a single second fluid conduit connected to the second body, and vice versa.

The forward projection on the first body extends into the U-shaped latch on the second body where its step is caught by the latch. Likewise, the forward projection on the second body is accepted and held by the latch on the first body. This holds the first and second bodies which form the coupling together.

The bodies may be separated by depressing both forward projections, so the steps on the projections are below the latches. This enables the bodies to be readily separated and pulled apart.

BRIEF DESCRIPTION OF DRAWINGS

Preferred embodiments of the invention, illustrative of the best mode in which Applicant has contemplated applying the principles, are set forth in the following description and are shown in the drawings and are particularly and distinctly pointed out and set forth in the appended claims.

Similar numbers refer to similar parts throughout.

DESCRIPTION OF THE PREFERRED EMBODIMENTS

Figure 1:
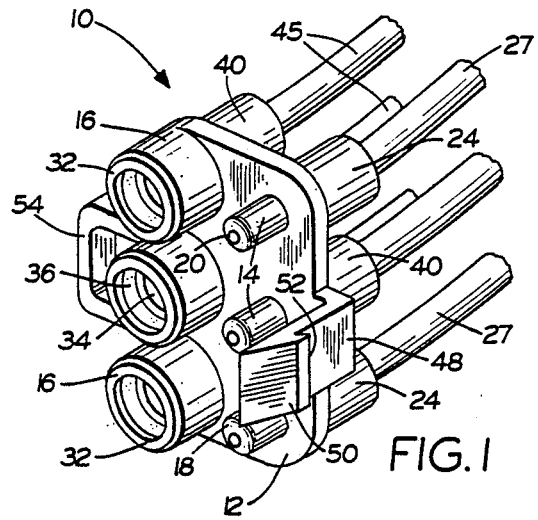
FIG. 1 is a perspective view of the hermaphroditic body of the quick-connect fluid coupling of the preferred embodiment of the present invention.

Referring now to the drawings and particularly to FIG. 1, there is shown therein an isometric view of a hermaphroditic body, generally indicated 10, of the preferred form of the quick-connect fluid coupling of the present invention. The term fluid hereinafter refers to any liquid, gas, or vacuum transport. Body 10 is preferably molded of vinyl plastic material, for use in automotive HVAC, or other materials which can be used for other applications, and includes a plate portion 12. A plurality of barrel portions 14 extend from plate portion 12 in a first direction. A plurality of sleeve portions 16 also extend from plate portion 12 in the first direction. If is to be understood that although the embodiment shown in the drawings has three pairs of barrel portions and sleeve portions, any number of barrels and sleeves may be used in other embodiments of the invention. In the preferred form, the barrel portions are positioned in alignment along a first line 13 and the sleeve portions are positioned in alignment along a second line 15 parallel of the first line. Each pair of barrel and sleeve portions are in alignment along third lines 17 which are uniformly spaced and perpendicular to both the first and second lines (see FIG. 3).

Figure 8:
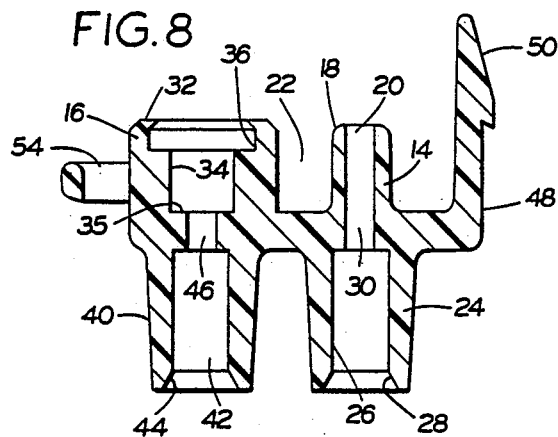
FIG. 8 is a sectioned view of the body along line 8—8 in FIG. 3.
Figure 9:
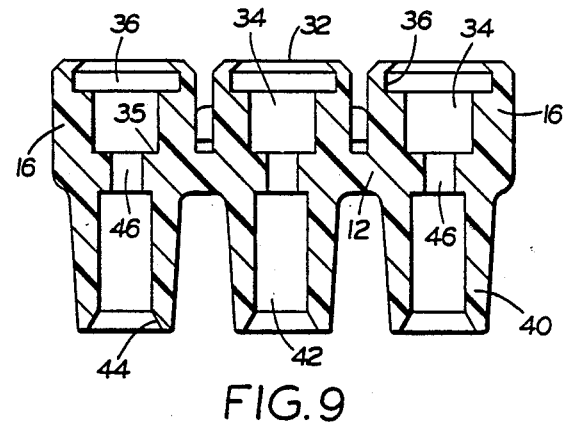
FIG. 9 is a sectioned view along line 9—9 in FIG. 4.

Each barrel portion 14 terminates at a tapered outward tip 18 (see FIG. 8). The outward tip includes a fluid opening 20. A clearance area 22 surrounds each barrel portion for purposes which are later explained.

Figure 2:
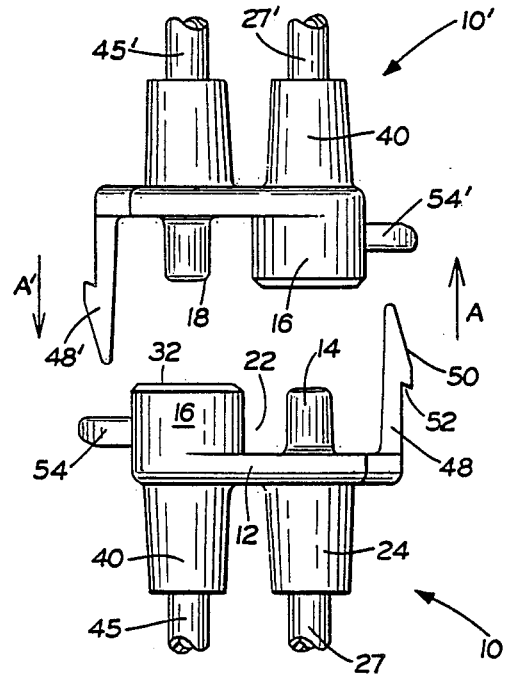
FIG. 2 is a side view of a first body, and an identical second body, in position to be joined to form the coupling of the preferred form of the invention.

Extending from plate portion 12 in a direction opposite barrel portion 14 is a first tube sleeve 24. First tube sleeve 24 includes a first tube accepting bore 26 coaxial with the barrel portion. First tube accepting bore 26 includes a tapered opening 28 to facilitate insertion therein of an end of a first tube 27 as shown in FIG. 2. The tubing is held in the first tube accepting bore by an adhesive or other holding means.

A first hole 30 extends through plate portion 12 and barrel portion 14 to fluid opening 20. First hole 30 serves as first fluid passage means for passing fluid between opening 20 and the first tube 27.

Figure 11:
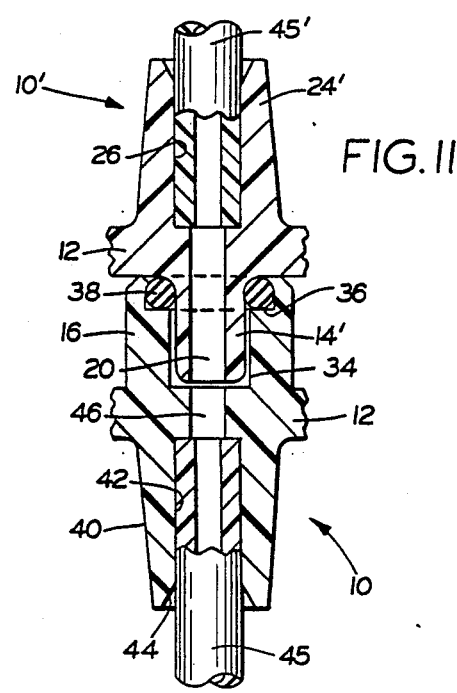
FIG. 11 is a sectioned view of a single barrel and sleeve portion of the preferred form of the coupling of the present invention shown in the connected position.
Figure 10:
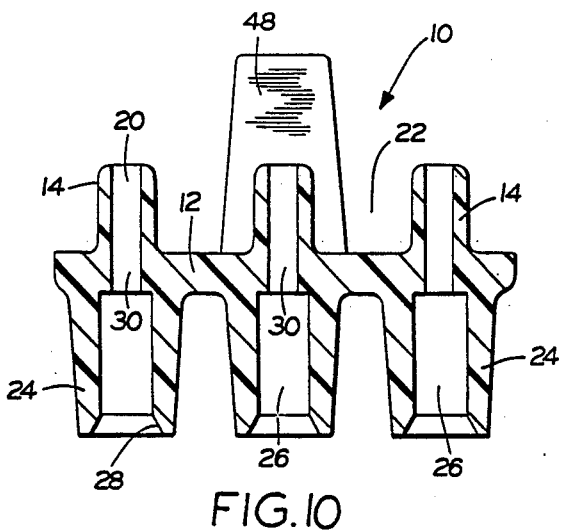
FIG. 10 is a sectioned view along line 10—10 in FIG. 4.

Sleeve portion 16 extends from the body in the first direction and terminates at an outer face 32. Sleeve portion 16 incorporates a cylindrical barrel accepting recess 34 sized for accepting barrel portion 14. Barrel accepting recess 34 terminates toward said plate portion in an innerface 35. Barrel accepting recess 34 also includes a slot 36 for holding a rubber O-ring seal 38 as shown in FIG. 11.

A second tube sleeve 40 extends from plate portion 12 in the direction opposite sleeve portion 16 and is coaxial therewith. Second tube sleeve 40 incorporates a second tube accepting bore 42. Second tube accepting bore 42 has a tapered opening 44 to facilitate insertion therein of an end of a second tube 45 as shown in FIG. 2. The tubing is held in the bore with an adhesive or other holding means.

A second hole 46 extends from second tube accepting bore 42 to the innerface 35 of barrel accepting recess 34. Second hole 46 serves as second fluid passage means for passing fluid between recess 34 and the second tube 45.

A forward projection 48 extends from a first side of body 10 in the first direction. Forward projection 48 is slightly pointed and terminates in an angled ramp 50. Angled ramp 50 includes a step 52. Forward projection 48 is bendable and resilient. A U-shaped latch 54 (see FIG. 3) extends outward from body 10 on a side opposite the forward projection.

As shown in FIG. 2, when a first body 10 and a second hermaphroditic body 10' are inter-fitted by movement in the directions of arrows A and A' respectively to form the coupling of the present invention, forward projection 48 of body 10 is accepted into latch 54' of body 10' and forward projection 48' of body 10' is accepted into latch 54 of body 10. The projections are inserted in the respective latches until the steps cause the projections to catch. Thus, the projections and latches serve as latching means for holding the coupling together. When it is desired to disconnect the coupling bodies, the forward projections are depressed so the steps no longer catch the latches and the bodies can be separated.

As shown in FIG. 11, when the first body 10 and second body 10' are inter-fitted to form the coupling of the present invention, barrel portions 14' of the second body are accepted into the barrel accepting recesses 34 of the first body. In the assembled condition, the sleeve portions occupy the clearance areas 22 around the barrel portions. The O-ring seals 38 serve as sealing means to seal the barrel portions and barrel accepting recesses in air tight relation. O-ring materials may be varied for different fluid-handling applications. Likewise, when the first body and second body are inter-fitted to form the coupling, the barrel portions of the first body are accepted into the barrel accepting recesses of the second body. As a result, the respective first and second tubes 27, 45 attached to the bodies are placed in fluid connection.

Figure 3:
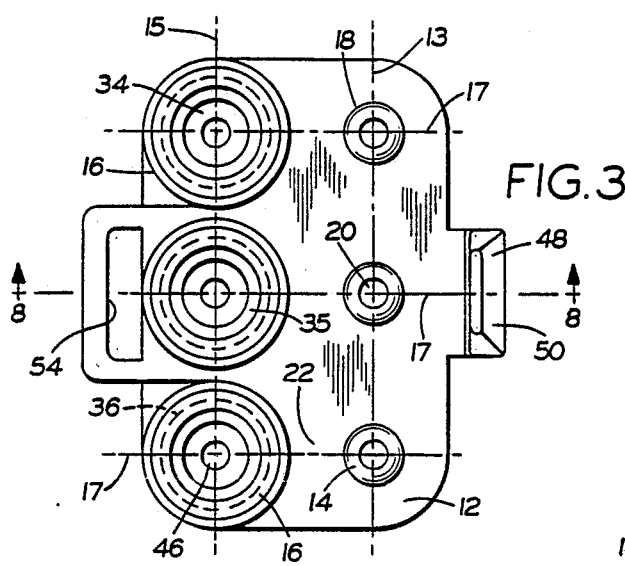
FIG. 3 is a top plan view of the body of the coupling.
Figure 4:
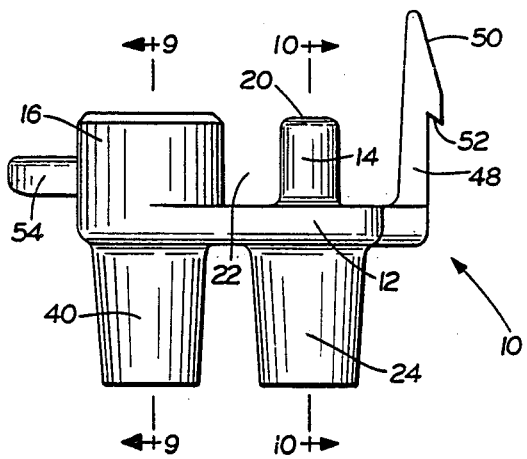
FIG. 4 is a side elevation view of the body of the coupling.
Figure 5:
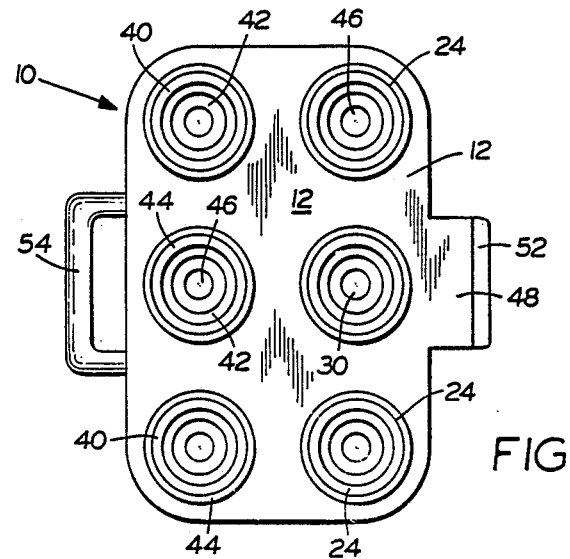
FIG. 5 is a bottom plan view of the body of the coupling.
Figure 6:
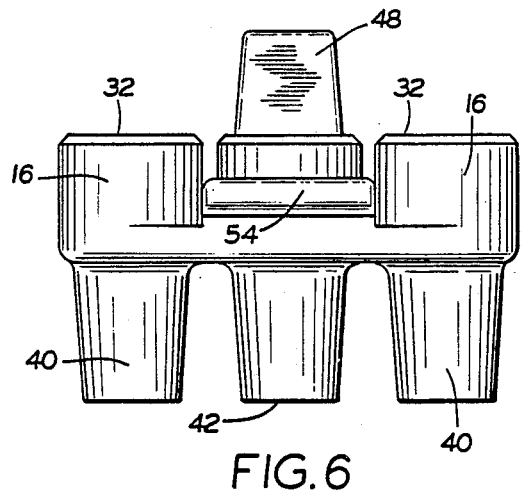
FIG. 6 is a left side elevation view of the body of the coupling.
Figure 7:
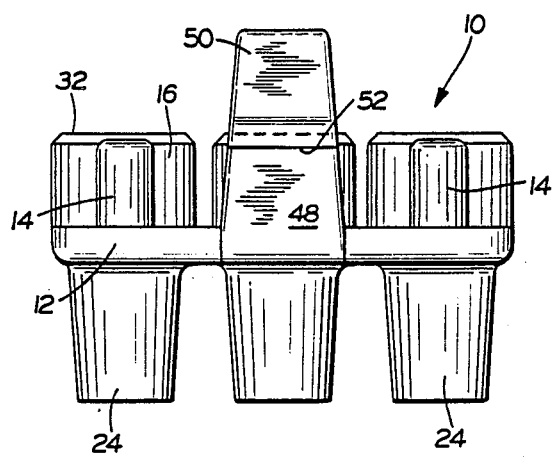
FIG. 7 is a right side elevation view of the body of the coupling.

As shown in FIGS. 3 and 5, the barrel portions and sleeve portions are arranged in a uniform pattern to enable the inter-fitting of the identical bodies which form the coupling. Those skilled in the art will understand that the principles of the present invention can be applied to couplings which interconnect varying numbers of fluid lines in various sequences and can be used with various latching arrangements for holding the coupling bodies together.

The quick-connect fluid coupling of the present invention provides a cost advantage over prior couplings in that the coupling is formed from two identical parts. This reduces tooling and manufacturing costs. The coupling is also easy to connect and disconnect making manufacture and maintenance operations easier. Thus, the foregoing quick-connect fluid coupling achieves the above stated objectives, eliminates difficulties encountered in prior devices, solves problems and obtains the desirable results described herein.

In the foregoing description, certain terms have been used for brevity, clarity and understanding, however no unnecessary limitations are to be implied therefrom, because such words are used for descriptive purposes and are intended to be broadly construed.

Moreover, the description and illustrations given are by way of examples, and the invention is not limited to the exact details shown or described.

Having described the features, discoveries and principles of the invention, the manner in which it is constructed and operated, and the advantageous and useful results obtained, the new and useful structures, devices, elements, arrangements, parts, combinations, systems, equipment operations and relationships are set forth in the appended claims.

I claim:

1. A coupling for simultaneously joining a plurality of fluid conduits including:
   (a) first and second identical bodies, each of said bodies being an integral one-piece member having a base and at least two parallel hollow barrel portions extending outwardly in a first direction from a first side of said first base and at least two hollow sleeve portions formed on said base and having barrel accepting recesses on said first side of the base whereby on joining of the first and second bodies each of the barrel portions of said first body are accepted by a slip-fit engagement into a respective barrel accepting recess of said second body and each of said barrel portions of said second body are accepted into a respective barrel accepting recess of said first body by a slip-fit engagement for individually placing each of a first plurality of fluid conduits adapted to be connected to the base of the first body, in fluid connection through said coupling to individual fluid conduits of a second plurality of fluid conduits adapted to be connected to the base of the second body;
   (b) a plurality of individual conduit accepting means formed on a second side of each of he bases of the first and second bodies, each of which is formed with an individual bore communicating with the respective barrel portion and sleeve portion on said base, to provide individual fluid paths through said bodies for each of the conduits;
   (c) latching means formed integrally with the first and second bodies for holding the bodies together in interfitting relationship; and
   (d) separate sealing means for sealing the barrel portions in their respective barrel accepting recesses in a fluid type relationship.

2. The coupling according to claim 1 wherein the sealing means is formed of a different material than that of the material of the first and second bodies.

3. The coupling according to claim 1 wherein said latching means comprises on each of said first and second bodies, a forward projection extending in said first direction on the first side of said body, and a projection accepting latch on the second side of said body, said second side of said body opposite said first side, whereby said forward projection on said first body is accepted into said latch on said second body and said forward projection on said second body being accepted into said latch on said first body.

4. The coupling according to claim 3 and further comprising a step on each of said forward projections on said first and second bodies, whereby said step extends through said latch to hold said bodies together in inter-fitting relation.

5. The coupling according to claim 1 wherein said sealing means in each of said bodies comprises an O-ring positioned in each of said barrel accepting recesses.

6. The coupling according to claim 5 and further comprising a slot in each of said barrel accepting recesses for holding said O-ring.

7. The coupling according to claim 1 wherein said barrel portions are aligned and in spaced relation along a first line, said first line intersecting and perpendicular to a first axis of each barrel portion; and said sleeve portions being aligned and in spaced relation along a second line, said second line parallel of said first line, said second line intersecting and perpendicular of a second axis of each sleeve portion.

8. The coupling according to claim 7 wherein each barrel portion is aligned with a barrel accepting recess along a third line, said third line perpendicular to said first and second lines.

9. The coupling according to claim 1 wherein said barrel portions and said sleeve portions are of generally equal length.

10. The coupling according to claim 9 wherein said barrel portion is cylindrical and is surrounded by a clearance area, and said clearance area accepts said sleeve portion of said second body when said first and second bodies are in inter-fitting relation.

11. The coupling according to claim 1 wherein said bodies are made of vinyl plastic material.

* * * * *